United States Patent [19]
Kharas et al.

[11] Patent Number: 5,894,068
[45] Date of Patent: Apr. 13, 1999

[54] REDUCTION OF $NO_x$ IN THE EXHAUST GASES FROM INTERNAL COMBUSTION ENGINES CONTAINING EXCESS OXYGEN

[76] Inventors: Karl C. C. Kharas; Michael George Henk; Heinz Juergen Robota, all of Allied-Signal Inc. Research & Technology, 50 E. Algonquin Rd., Des Plaines, Ill. 60017-5016

[21] Appl. No.: 07/990,216

[22] Filed: Dec. 14, 1992

[51] Int. Cl.⁶ .................. B01J 35/00; B01J 23/56
[52] U.S. Cl. .................. 502/327; 502/326; 502/332; 502/328; 502/439; 502/527; 423/213.5; 422/169; 422/170; 422/171
[58] Field of Search .................. 502/326, 327, 502/332, 328, 439, 527; 423/213.5, 215.5; 422/169, 170, 171

[56] References Cited

U.S. PATENT DOCUMENTS

| | | | |
|---|---|---|---|
| 4,091,072 | 5/1978 | McArthur | 502/326 X |
| 4,118,199 | 10/1978 | Volker et al. | 422/171 |
| 4,154,568 | 5/1979 | Kendall et al. | 422/171 X |
| 5,051,244 | 9/1991 | Dunne et al. | 423/213.5 X |
| 5,179,053 | 1/1993 | Subramanian et al. | 502/65 |
| 5,471,836 | 12/1995 | Takeshima et al. | 60/297 |
| 5,487,268 | 1/1996 | Itoh et al. | 60/274 |
| 5,531,972 | 7/1996 | Rudy | 423/212 |

FOREIGN PATENT DOCUMENTS

| | | | |
|---|---|---|---|
| 53-039252 | 4/1978 | Japan | 422/171 |
| 1584998 | 2/1981 | United Kingdom | 422/171 |

*Primary Examiner*—Douglas J. McGinty
*Attorney, Agent, or Firm*—Kuffner & Associates

[57] ABSTRACT

Removal of carbon monoxide, hydrocarbons, and nitrogen oxides from the exhaust gas from lean-burn, diesel and other engines which produce exhaust gases containing excess oxygen is provided by at least two catalysts in sequence, each capable of reducing nitrogen oxides within a particular range of engine operating temperatures. Oxidation of the remaining reducing gases is also accomplished.

11 Claims, 5 Drawing Sheets

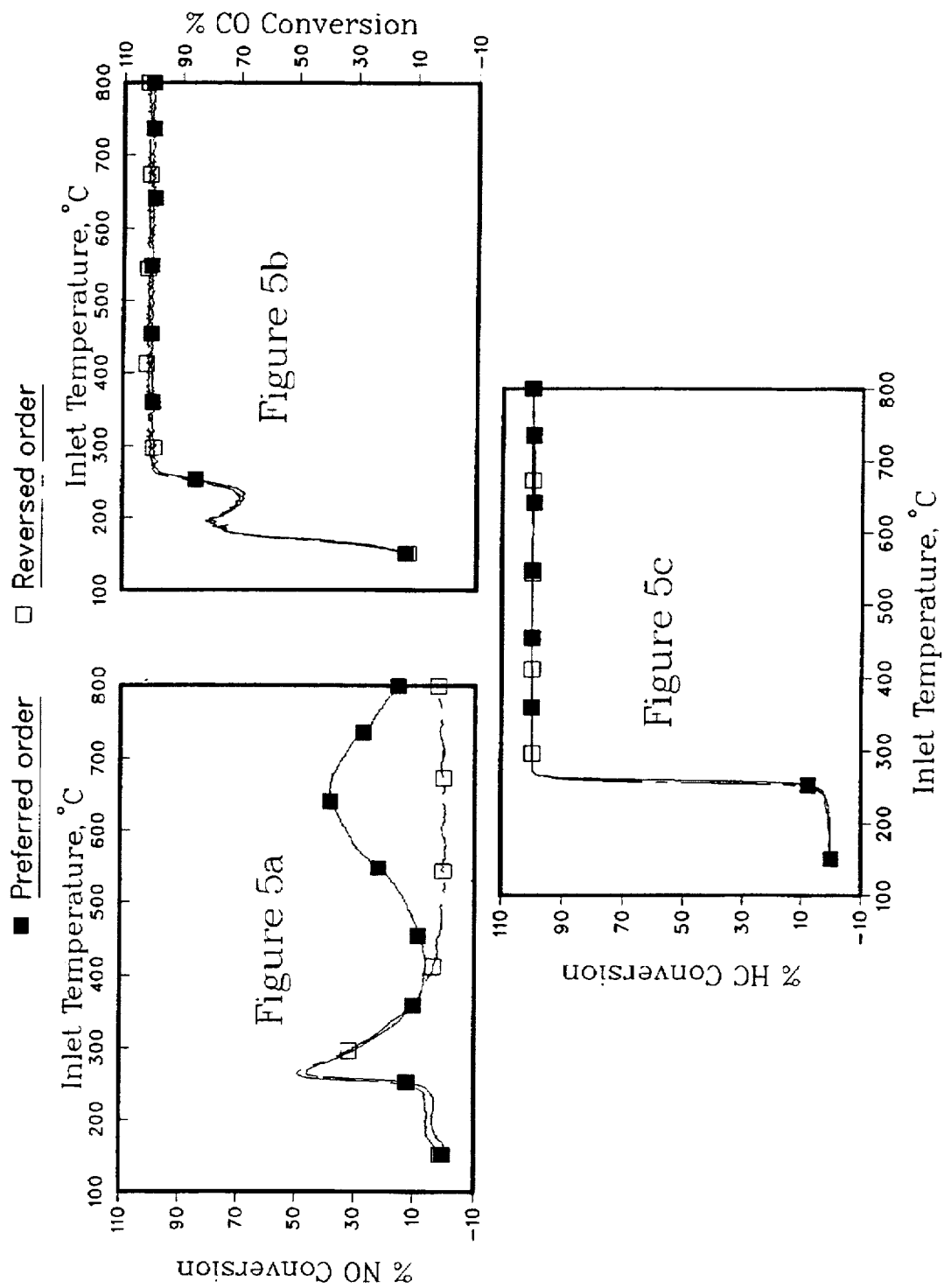

REDUCTION OF $NO_X$ IN THE EXHAUST GASES FROM INTERNAL COMBUSTION ENGINES CONTAINING EXCESS OXYGEN

BACKGROUND OF THE INVENTION

The invention relates generally to the control of hydrocarbons (HC), carbon monoxide (CO), and nitrogen oxides ($NO_x$) in the exhaust of internal combustion engines. More particularly, the invention relates to the removal of $NO_x$ when the exhaust gases include excess oxygen beyond that needed for combustion of the fuel. This is typically the case with lean-burn engines, diesel engines, and other engines currently under development which produce such exhaust gases.

In recent years three-way catalysts have been used to remove all of the three principal noxious components in auto exhaust gases. The engines are run with stoichiometric air/fuel ratios and the catalysts are able to remove all three components at the same time, that is, a single catalyst is sufficient over the range of engine operating temperatures. More recently development of so-called "lean-burn" engines is being driven by the desire to improve fuel economy. However, such engines operate with air-fuel ratios which are far from the typical stoichiometric conditions. Instead of an air-fuel ratio of about 14.55/1 by weight, the lean-burn engine may operate with air-fuel ratios above 18/1, up to about 22–24/1, or even higher ratios for diesel engines. Under such conditions the engine exhaust will include more hydrocarbons, less carbon monoxide, and less, but still excessive nitrogen oxides. While an oxidation catalyst is capable of removing hydrocarbons and carbon monoxide, since the oxygen content is high, say about 3–10% by volume, it is clear that conditions are not favorable for the reduction of nitrogen oxides. Much effort has gone into a search for catalysts which can destroy nitrogen oxides under oxidizing conditions, but the results have not been satisfactory to date. Published information most pertinent to the present invention will be discussed below.

The use of base metals, particularly copper, ion-exchanged onto a zeolite support has been proposed by many workers in the art to be effective for reduction of nitrogen oxides. Others have suggested that such a catalyst should be combined with oxidation or three-way catalysts, usually in sequence. Toyota has proposed such arrangements in applications published in Japan. In JP Kokai 310742/1989 reference is made to earlier applications in which zeolites carrying transition metals are combined with downstream three-way or oxidation catalysts. These were said to be deficient and a catalyst was proposed which added noble metals to a copper-zeolite catalyst. Various methods of combining these materials are suggested. A related application is JP Kokai 127044/1989 in which an oxidation catalyst is deposited as a first layer, followed by a second layer of copper on a zeolite.

In EP 0488250A1 Toyota proposed three catalysts in series. Toyota discusses the use of various catalysts for removal of $NO_x$ from the exhaust of lean burn engines. Pt on zeolite is useful at low temperatures and Cu on zeolite at higher temperatures, but other catalysts are shown to be useful at inlet temperatures of about 300° C. These are the noble metals combined with the oxides of rare earth metals and metals from Group IVa of the Periodic Table (IUPAC), such as Ti, Zr, and Hf.

In EP 0494388A1 the applicants disclose two stages of catalysts for first removing nitrogen oxides and then oxidizing the remaining hydrocarbons and carbon monoxide. The $NO_x$ removal catalyst are defined as phosphates, sulfates, or aluminates of transition metals of the 4th period of the Periodic table (e.g. Cr, Mn, Fe, Co, Ni, Cu, Zr). The oxidation catalyst is generally described as a noble metal, a base metal or a perovskite on a support.

There are two generally recognized routes to removing nitrogen oxides. First, the nitrogen oxides can be decomposed to the diatomic nitrogen and diatomic oxygen. This reaction is thermodynamically favored, but catalysts which are able to carry out this reaction under the highly oxidizing conditions and high temperatures found in engine exhaust have not yet been found. The second route is the chemical reduction of nitrogen oxides using reducing agents present in the exhaust, such as carbon monoxide, hydrocarbons, and hydrogen. This is considered to be the mechanism of the three-way catalyst. However, such catalysts see the exhaust from an engine operating with a stoichiometric air-fuel ratio which contains little oxygen. When a large excess of oxygen is present, as in a lean-burn or diesel engine, the oxygen can preferentially react with the hydrocarbons, carbon monoxide, and hydrogen thus removing the reducing agents needed to remove nitrogen oxides. The present inventors have found that this problem can be overcome, as will be disclosed in the discussion below.

SUMMARY OF THE INVENTION

Generally, the invention is a multicomponent catalyst which is capable of removing carbon monoxide, hydrocarbons, and nitrogen oxides from the exhaust gases produced by an engine which is operated with an excess of air relative to that required for stoichiometric combustion of the fuel, such as lean-burn, diesel, and the like. The catalyst comprises at least two components in sequence, each catalyst is capable of reducing nitrogen oxides within a particular temperature range which begins near the onset of activity for oxidation of the carbon monoxide and hydrocarbons by oxygen. In combination the catalysts are placed so that they are able to reduce nitrogen oxides over the full range of engine operating temperatures. Additionally, by proper placement of the catalysts the reducing agents such as carbon monoxide, hydrocarbons and hydrogen can also be oxidized while the nitrogen oxides are reduced. In particular, the catalysts are placed so that the least active catalyst is exposed to the exhaust gases first, followed by the next least active and so on with the most active catalyst in the last position.

In one embodiment, three catalysts are placed in the following sequence to remove carbon monoxide, hydrocarbons and nitrogen oxides from the exhaust of lean-burn engines:

(a) a first catalyst capable of reducing nitrogen oxides at temperatures above the second and third catalysts, for example about 475° C. and up to about 800° C., preferably the catalyst is cobalt atomically dispersed on gamma alumina;

(b) a second catalyst capable of reducing nitrogen oxides at temperatures above the third catalyst and below the first catalyst, for example about 315° C. and up to about 475° C., preferably the catalyst is an alloy of platinum, rhodium, and cobalt dispersed on a barium oxide stabilized delta alumina;

(c) a third catalyst capable of reducing nitrogen oxides at temperatures below the first and second catalysts, for example about 200° C. and up to about 425° C., preferably the catalyst is an alloy of platinum and rhodium dispersed on an alpha alumina support.

In one aspect, the invention is a method for reducing nitrogen oxides and oxidizing carbon monoxide and hydrocarbons in the exhaust from lean burn engines using the multicomponent catalysts described above, in which the catalyst of the invention that the catalysts are placed in sequence with the least active catalyst upstream of the more active catalysts.

BRIEF DESCRIPTION OF THE DRAWINGS

FIG. 5 is a plot of conversion of NO, HC, and CO versus temperature for the first and third catalysts of the invention in the preferred and reversed order.

DESCRIPTION OF THE PREFERRED EMBODIMENTS

Figure 1:
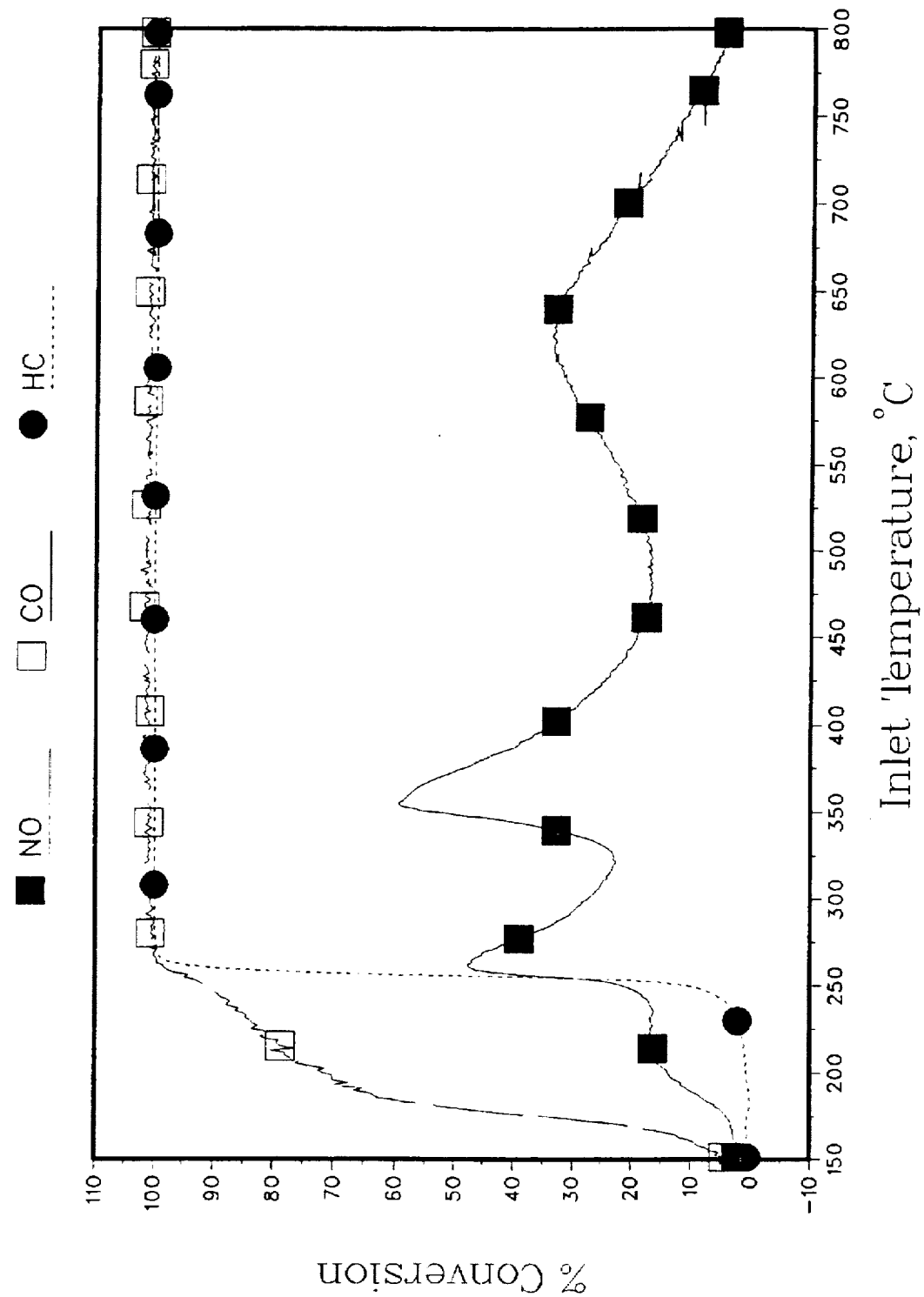
FIG. 1 is a plot of conversion of NO, HC, and CO versus temperature for a catalyst of the invention.

Those working in this field intend to either decompose nitrogen oxides into the elements directly or to reduce them using reducing agents under oxidizing conditions. The catalysts and catalyst systems of the present invention are considered to function by reducing the nitrogen oxides rather than decomposing them. However, that conclusion was reached based on experimental evidence and is not an essential aspect of the invention. The reaction mechanisms by which nitrogen oxides are reduced are believed to vary depending on the catalyst and the operating temperatures.

It has been discovered that catalysts may function differently depending upon the operating conditions and that each catalyst has a temperature range within which it is capable of destroying nitrogen oxides. This is generally contrary to the experience with three-way catalysts which become active ("light-off") at a temperature of about 250° to 350° C. and thereafter are able to oxidize hydrocarbons and carbon monoxide while reducing nitrogen oxides over the usual range of operating temperatures, say about 300° to 800° C. It should be noted here that auto exhaust changes its composition and its temperature as driving conditions change. Consequently, tests of auto exhaust catalysts require that a car be operated over a range of conditions representing typical driving. Once three-way catalysts have reached operating temperature the performance is not greatly affected by the exhaust gas temperature. This is not the case with catalysts for engines operating in the lean-burn mode. It has been generally found that catalysts will have a temperature range over which they are effective to remove nitrogen oxides and outside that range they are not. As will be appreciated, such a characteristic is not compatible with the usual variation in engine exhaust temperatures. We have found that by proper selection of catalysts that it is possible to remove nitrogen oxides from temperatures of about 250° to 700° C.

Selection of catalysts for this difficult task requires consideration of the characteristics of each catalyst. It is believed that the chemical reactions differ with the catalyst composition and the temperature of operation. Consequently, it has not been possible to find a single catalyst capable of covering the full temperature range of lean-burn engine exhaust in the same manner as has been done with engines operating with stoichiometric air-fuel ratios. Typically, each catalyst has a temperature range within which it is effective and outside that range the conversion of nitrogen oxides is minimal. At the same time it is still necessary to remove the reducing agents including residual hydrocarbons, hydrogen, and carbon monoxide. Based on the results of our experiments we believe that certain catalysts may be capable of reducing nitrogen oxides within a particular temperature range but still remain very effective for oxidizing the reducing agents i. e. hydrocarbons and carbon monoxide, at other temperatures. Thus, it appears that providing for both the reduction of nitrogen oxides and the oxidation of the reducing agents involves not only selection of the proper catalysts but the proper combination of catalysts and their positioning in order to achieve the desired reduction of nitrogen oxides throughout the range of operating conditions of a lean burn engine.

In the following discussion, a preferred group of three catalysts will be described which cover the normal range of operating temperatures. However, in a broader sense, the invention may be carried out with two or more catalysts which are disposed so that the least active catalyst is exposed to the exhaust gases first followed by the more active catalysts.

First Catalyst

The first catalyst in the sequence will receive exhaust gases immediately after they leave the engine. Consequently, they will be hotter and contain the highest concentrations of hydrocarbons, carbon monoxide, and nitrogen oxides. Thus, the first catalyst should have the capability of reducing nitrogen oxides at high temperatures, but need not have the ability to oxidize residual hydrocarbons, hydrogen and carbon monoxide to $CO_2$ and $H_2O$, although some or all of the desired removal could occur. Such residual reducing agents can be cleaned up by the downstream catalysts.

The temperature of engine exhaust gases may vary from 200° C. to 900° C. depending on the operating conditions. The first catalyst therefore should be capable of operating at temperatures in the upper portion of the range, particularly above 600° C. When the temperatures are below that at which the first catalyst is useful, the gases will pass with only minor changes to the second and third catalysts, although at slightly lower temperatures since some heat will be lost.

The preferred first catalyst is comprised of cobalt oxide deposited on a gamma alumina. This catalyst has been found to be operative for reduction of nitrogen oxides and oxidation of hydrocarbons at temperatures above about 475° C. Below that temperature, only a small effect is seen. Consequently, it will be appreciated that this catalyst is particularly suited for the role allotted to the first catalyst.

Similar catalysts have been disclosed by Hamada et al., Applied Catalysis, 1991, 75, L1–L8 who impregnated alumina with solutions of cobalt compounds, followed by drying and calcining. They reported that the ability of the catalyst to reduce NO to $N_2$ was strongly affected by the source of the cobalt and that the performance of alumina alone was significant. The temperature of calcination was suggested to be a factor and it was speculated that formation of cobalt aluminate species was involved in the improved performance found with higher temperature calcination of cobalt acetate on γ-alumina. The authors postulated that $NO_2$ was formed by oxidation of NO followed by reduction with an oxygenated species of propane.

The cobalt content of the first catalyst may be from about 4 to 35%, preferably 7 to 14%. We believe that the catalyst performance is enhanced by preparations which provide atomically dispersed cobalt oxide. Various methods may be used, such as those discussed by Bai et al., J. Solid State Chem. 91, 148,152 (1991). However, it should be noted that the study by Bai et al. had no relation to the present use for CoO on γ-alumina catalysts. Various precursor compounds were used to impregnate gamma alumina and then dried at 230° C. and finally heat treated at 450° C. In particular, we prefer to use an aqueous solution of cobalt acetate and adjust the pH to 2.4 with acetic acid prior to the impregnation of γ-alumina. More broadly, other cobalt compounds such as cobalt (II) carbonate could be used and the pH adjusted to about 2 and 4 by addition of an acid such as citric acid, tartaric acid, glycolic acid, lactic acid, malic acid and the like.

The alumina should be a gamma alumina since it has been found that other types of alumina provide poorer performance with regard to the reduction of nitrogen oxides. However, gamma alumina is gradually converted to other crystalline phases when exposed to high temperatures. Consequently, the presence of some of the higher forms of alumina is not excluded.

Second Catalyst

The second catalyst will receive exhaust gases after they have been exposed to the first catalyst. At that time the nitrogen oxides and hydrocarbons may have been substantially destroyed if the operating conditions for the first catalyst are within its range, that is, above about 475° C. If the temperature is lower, there may have been only a small amount of conversion. In such a case, the second catalyst, which has its best operating range above about 315° C. and generally below about 475° C. will provide the principal catalytic activity. Conversely, when the first catalyst is within its operating range the second catalyst need only back up and further reduce the amount of the hydrocarbons and carbon monoxide which remain.

The second catalyst has at least two unique features. First, it employs a new support, which is a barium stabilized delta alumina. Second, it combines noble metals, particularly platinum and rhodium with cobalt in an alloyed form, which will be seen to provide advantages relative to the comparable non-alloyed metals.

The support for the second catalyst is prepared by a sol-gel procedure which produces a very stable delta alumina and, although it contains a substantial amount of barium, appears to be solely alumina when examined by x-ray diffraction. A typical example of the preparation of this support is given in Example 2 below. It has been found that barium appears to be unique, for tests with calcium and lanthanum acetates failed to provide a comparable stable δ alumina. Also, it has been found that polyethylene glycol is apparently unique also, since substitution of sorbitol and citric acid produced different aluminas. Finally, barium acetate has been shown to produce a pure delta alumina while barium nitrate and barium acetyl acetonate did not. Accordingly, the process for preparing the BaO-δ-Al$_2$O$_3$ support is believed to require the following steps.

(1) an aqueous barium acetate solution is prepared having a concentration suitable to provide about 5 to 12 wt. % Ba in the product;

(2) an aqueous boehmite sol having particles above about 150 Å (15 nm), preferably below 300 Å (30 nm) is stirred;

(3) the stirred sol of (2) is combined with the aqueous barium acetate solution of (1) and about 2 to 30 wt. % (preferably 10 to 25 wt. %) of polyethylene glycol (PEG) relative to the sum of PEG plus water to form a gel;

(4) the gel produced in step (3) is dried and then calcined in air to 1000° C.;

(5) the calcined gel of (4) is then treated at about 1000° to 1350° C., preferably about 1140° C., in an atmosphere containing about 0 to 30% steam, preferably about 10% steam, to convert the alumina into an essentially pure delta alumina.

This unique delta alumina is very stable and at temperatures up to 1350° C. has been found to retain the delta form with only a small amount of theta alumina and no alpha alumina being formed.

Another feature of the second catalyst is the use of alloyed noble metals from Group VIII. Heretofore, it has been thought that alloying was detrimental to catalyst performance. See, for example, J. T. Kummer, J. Phys. Chem. 1986, 90, 4747–4752. Also, sintering of the noble metal crystallites has been seen in aged auto catalysts, suggesting that loss of activity is associated with sintering of the noble metals. Typical three-way catalysts used with engines operated with a stoichiometric air/fuel ratio are prepared by impregnating supports with noble metal solutions and heating to temperatures of about 450 to 700° C. This process does and is intended to decompose the noble metal compounds and leave the metals as separate crystallites on the support. In the present catalyst, which is operated under oxidizing conditions, it has been found that alloying the noble metals provides durable catalysts for reduction of nitrogen oxides. Alloying of the noble metals may be done by various methods. One preferred method of alloying is to hydrothermally treat the impregnated support in an atmosphere containing 3 to 30% steam, preferably about 10% steam (remainder an inert gas such as nitrogen) at temperatures of about 600° to 1200° C. until the alloying is completed. Since the support is also produced by a process which uses a high temperature treatment to convert the alumina into a stable delta alumina, it is feasible to use such a process to alloy the noble metals.

The noble metals of Group VIII include Pt, Pd, Rh, Ru, Os, and Ir. Generally, only Pt, Pd, and Rh are used in automobile exhaust catalysts. For the second catalyst Pt and Rh are preferred in atomic proportions of 5/1 to 30/1, although Pd could be included if desired. In addition, the second catalysts may contain cobalt, a base metal of Group VIII. The other base metals of Group VIII, namely Ni and Fe, and metals of Groups IVa and IVb such as Sn, Ce, Ti, and Pb may be included. The noble metals will be about 0.01 to 5.0 g/L, preferably 0.7 to 3.6 g/L, most preferably 1.0 to 2.5 g/L, if disposed on a monolithic carrier. The cobalt or other base metal, if present, will be about 0.01 to 3.0 g/L, preferably 0.1 to 1.0 g/L, most preferably 0.2 to 0.5 g/L, if disposed on a monolithic carrier.

Addition of the noble metals may be done by impregnation techniques familiar to those skilled in the art or deposition of colloidal alloys onto the support material. Generally, these involve contacting the support with an aqueous solution of the metal (or metals) compound to be deposited and subsequently drying and heating the impregnated support to decompose the metal compounds. The concentration of the metal compounds in solution will be adjusted to provide the amount of metals in the finished catalyst. The noble metal compounds may be those used in the past, such as halogenated compounds (e.g. chloro platinic acid, rhodium chloride), nitrates (e.g. rhodium nitrates), acetates (e.g. rhodium acetate), and for platinum the sulfite acid (hydroxy disulfite platinum II acid). Preferred noble metal compounds include rhodium nitrate, rhodium sulfite, rhodium oxalate, platinum oxalate and platinum sulfite.

The base metal cobalt is preferably applied by impregnation of the support with an aqueous solution of a cobalt compound, such as cobalt II nitrate, although others such as cobalt acetate and cobalt oxalate may also be used. The choice of base metal compounds will be determined by their kinetic ability to alloy with platinum.

Third Catalyst

The third catalyst is a very active catalyst capable of oxidizing hydrocarbons and carbon monoxide under lean-burn conditions at temperatures above about 150° C. and of reducing nitrogen oxides between about 200° C. and 425° C. This catalyst has the lowest temperature "window" of the three. It will reduce nitrogen oxides principally during the period after initial engine start and any other conditions where the exhaust gases are relatively cold, such as during extended engine idle or low speed cruising. It is placed in the third position not only because the exhaust gases are the coldest there, but because if located upstream of the first or second catalysts it would remove the reducing agents necessary for the first catalyst to operate when the gas temperatures are high. That would render the first or second catalysts ineffective even at higher temperatures when they should be operating to reduce nitrogen oxides and the third catalyst is not able to do so.

It is a unique feature of the third catalyst that it is disposed on or near the surface of an alpha alumina support. Such materials are known to have a low surface area and would ordinarily be avoided in formulating auto exhaust catalysts. However, it may be noted that higher surface area $\gamma$-aluminas have been found to have undesirable interactions with rhodium in auto exhaust catalysts especially under oxidizing conditions. The surface loading of the noble metals may be accomplished by impregnation techniques familiar to those skilled in the art.

The noble metals of Group VIII will be Pt, Pd, and/or Rh, preferably Pt and Rh in atomic proportions of 5/1 to 30/1, the total noble metal content being about 0.01 to 5.0 g/L, preferably 0.7 to 3.6 g/L, most preferably 1.0 to 2.5 g/L, when disposed on a monolithic carrier.

The methods of producing such catalysts may be similar to those discussed above in connection with the second catalyst. Typically, the noble metals will be impregnated onto the alpha alumina support such that they remain at or near the surface. After drying and optionally calcining the catalysts will be given a hydrothermal treatment at high temperature to alloy the noble metals. Again, it may be noted that since the support is stable at high temperatures, the use of very high temperatures to alloy the noble metals is feasible.

Disposition of the Catalysts

The three catalysts just described may be placed in sequence by several methods. The most obvious method would be to place such catalysts in separate containers, and then position them in sequence, with the first catalyst closest to the engine exhaust. The supported catalysts typically would be disposed on a ceramic or metallic monolith of the type commonly used in current commercial practice. Alternatively, non porous pellets could be substituted for the monoliths. Although the catalysts have been described as being disposed on their supports, in order to place them on non-porous carriers it may be preferred to coat the supports first, that is, with $\gamma$-alumina for the first catalyst, BaO-$\delta$-alumina for the second catalyst, and $\alpha$-alumina for the third catalyst, and then deposit the active catalytic metals on the wash coated carrier.

Alternative methods suggest themselves. For example, a single unit would be made by placing the catalysts in sequence on a single monolith or by packing pelleted catalysts in sequence into a single container. Such methods would be less expensive but might provide less flexibility in disposition of the catalysts.

As previously discussed, the order in which the catalysts are placed is important. This is illustrated in FIG. 5 in which the performance of the preferred first and third catalyst is shown. It will be seen that if the first catalyst (CoO-$\gamma$Al$_2$O$_3$) is downstream of the third catalyst (Pt, Rh-$\alpha$-Al$_2$O$_3$) that there is no reduction of nitrogen oxides at temperatures above about 425° C.

EXAMPLE 1

Preparation of the First Catalyst 18.4 g cobalt acetate hydrate was dissolved in 450 g deionized water. 450 g glacial acetic acid was added, which produced a pH of 2.7. 50 g of 20–40 mesh $\gamma$-Al$_2$O$_3$ (made by calcining LaRoche Forming Grade boehmite) was added to the cobalt solution and the resulting mixture evaporated to dryness over a 3-hour period. Then, the dry material was calcined for 2 hours at 150° C. and then at 600° for 6 hours.

EXAMPLE 2

Preparation of BaO-$\delta$-Al$_2$O$_3$ Support 250 mL of a boehmite sol (VISTA Chemical Dispal 11N7-12) was placed in a 4000 mL beaker. 15.82 g barium acetate was dissolved in 10.3 mL of deionized water. The boehmite sol was stirred and the barium acetate solution along with 40.5 g of polyethylene glycol (Sigma PEG3265) were added simultaneously, producing a gel. The gel was transferred to an evaporating dish and dried in an oven at 120° C. The dried gel was then calcined at 1000° C. for 6 hours. A pure $\delta$ alumina was the result, with no evidence of separate barium containing phases.

EXAMPLE 3

Preparation of the Second Catalyst 9.45 g of platinum sulfite acid solution (2.55 wt. % Pt), 2.44 g of rhodium nitrate solution (0.50 wt. % Rh), and 0.036 g of cobalt (II) nitrate hexahydrate were dissolved in 170 g of deionized water. The solution was brought into contact with 18 g of the BaO-$\delta$-Al$_2$O$_3$ support prepared as in Example 2A. The resulting impregnated support was dried at 100° C. for 3 hours and then calcined at 600° C. for 6 hours. The calcined catalyst was hydrothermally treated at a temperature of about 1140° C. for 6 hours in an atmosphere of nitrogen containing about 10% steam to alloy the noble metals.

EXAMPLE 4

Preparation of the Third Catalyst

A. 15.8 g of platinum sulfite acid solution (1.71 wt. % Pt) and 2.68 g of rhodium nitrate solution (0.50 wt. % Rh) were dissolved in 45 g of deionized water. The solution was brought into contact with 20 g of $\alpha$-alumina made by calcining at 1350° C. for 9 hours a commercial $\gamma$-alumina supplied by UOP. The resulting impregnated support was dried at 100° C. for 3 hours. The calcined catalyst was hydrothermally treated at a temperature of about 1194° C. for 6 hours in an atmosphere of nitrogen containing about 10% steam to alloy the noble metals.

B. The preparation described above (A) was repeated except that 0.034 g of cobalt acetate tetrahydrate was dissolved in the platinum-rhodium solution so that the resulting catalyst contained cobalt in addition to the precious metals.

EXAMPLE 5

Figure 2:
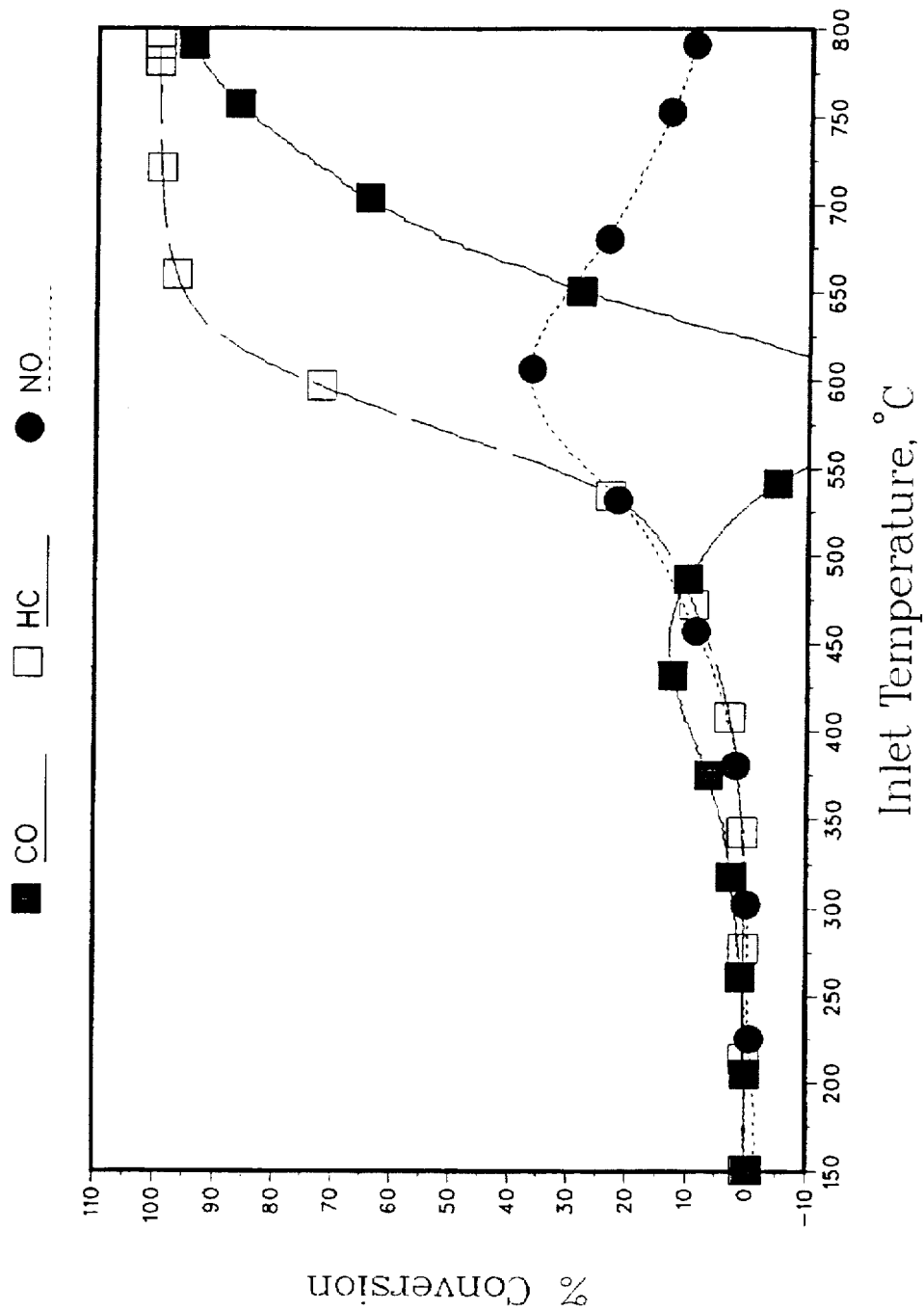
FIG. 2 is a plot of conversion of NO, HC, and CO versus temperature for a first catalyst of the invention.
Figure 3:
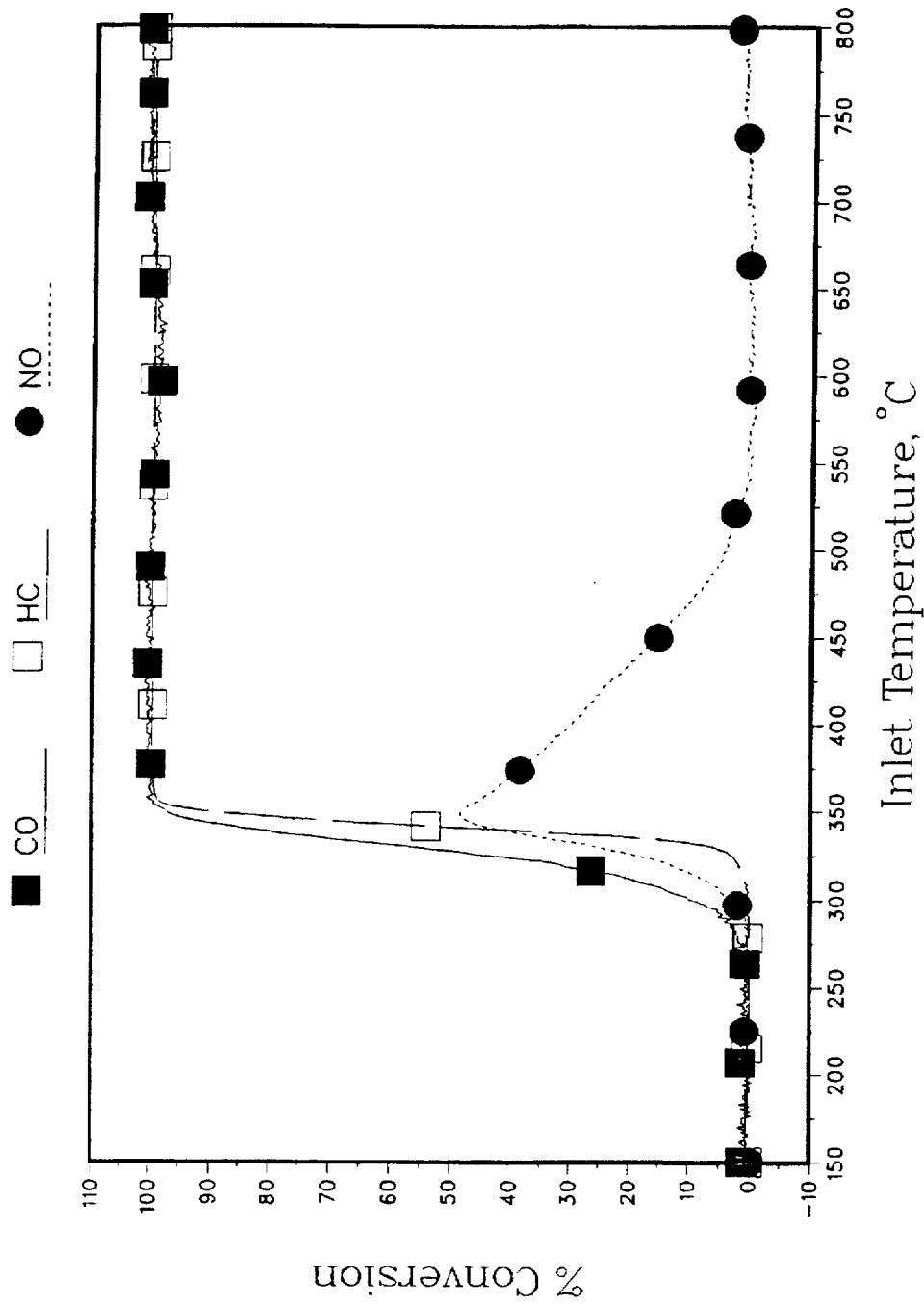
FIG. 3 is a plot of conversion of NO, HC, and CO versus temperature for a second catalyst of the invention.
Figure 4:
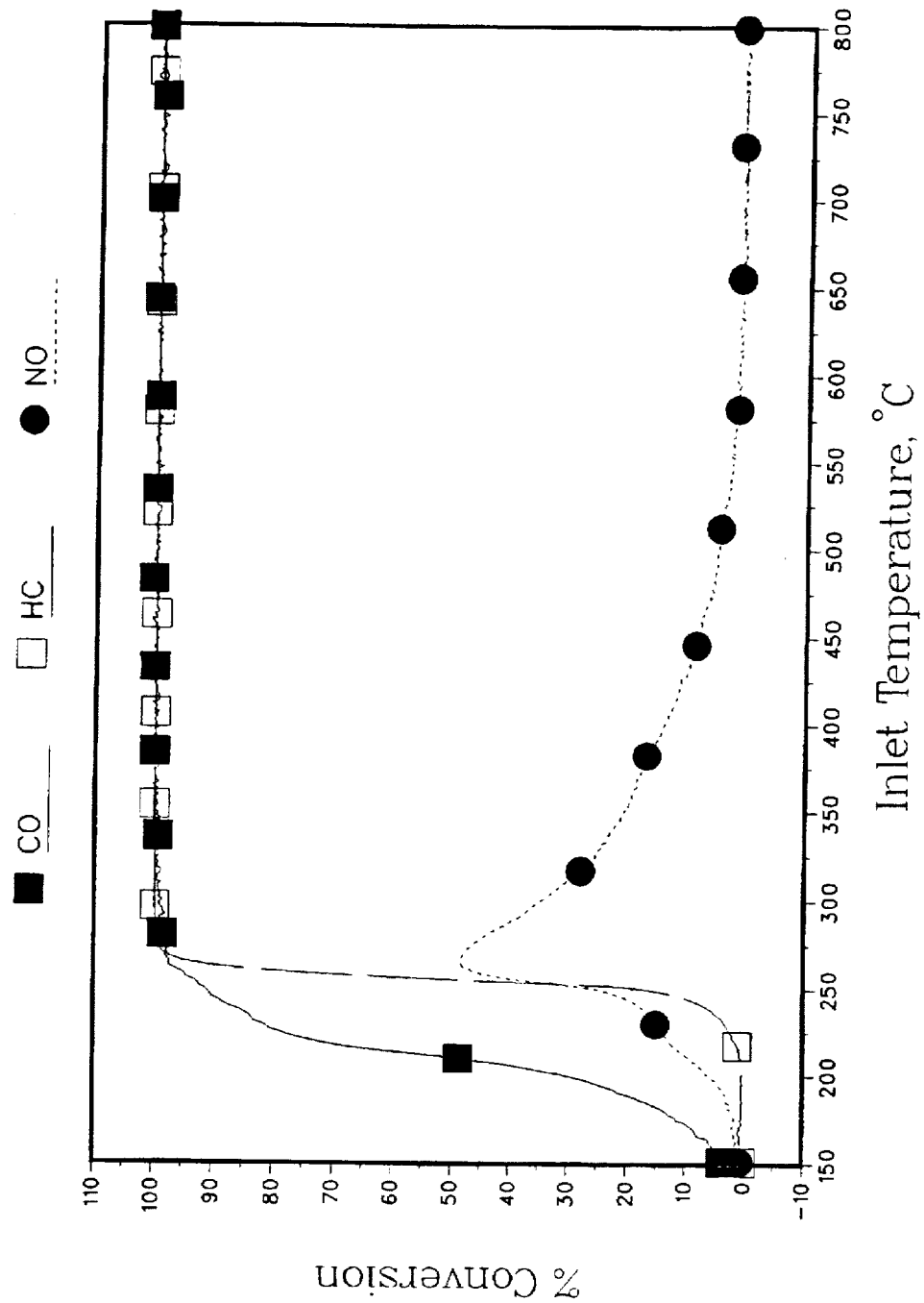
FIG. 4 is a plot of conversion of NO, HC, and CO versus temperature for a third catalyst of the invention.

The three catalysts of the invention were prepared as pellets and placed in sequence in a single bed as follows. 1 g CoO on $\gamma$-$Al_2O_3$ (Example 1) at the reactor inlet, then 1 g Pt.Rh.Co on BaO-$\delta$-$Al_2O_3$ (Example 3) and 1 g Pt.Rh on $\alpha$-$Al_2O_3$ (Example 4A) at the reactor outlet. The sequential catalysts were tested by exposure to a synthetic exhaust gas containing 1200 ppm $NO_x$, 3000 ppm CO, 1000 ppm $H_2$, 1600 ppm HC (hydrocarbon), and 3.2 vol. % $O_2$, remainder nitrogen and 10 vol. % steam. The temperature was gradually increased up to a maximum of 800° C. (rise 1) and then reduced to 50° C. and repeated (rise 2). The performance of the catalyst is shown in FIG. 1 for rise 1. It can be seen that the conversion of $NO_x$ begins at a low temperature and appears related to the conversion of CO at first and then conversion of HC. The conversion of $NO_x$ is maintained at about 30% until about 700° C. it begins to drop. Since the normal operating temperature range for automobiles only occasionally exceeds 650° C., the removal of $NO_x$ is possible under most conditions. The operating temperatures of the individual catalysts tested in a similar manner are shown in FIGS. 2–4. It will be seen that as separate catalysts, they each have limited ability to cover the full range of exhaust gas temperatures.

EXAMPLE 6

In the preferred order, 1 gram of CoO on $\gamma$-$Al_2O_3$ (Example 1) was placed at the reactor inlet and 3 grams of Pt.Rh.Co on $\alpha$-$Al_2O_3$ (Example 4B) was placed at the reactor outlet. The catalysts were tested according to the manner of Example 5; results are shown in FIG. 5. Contribution for NO reduction by both catalysts can be discerned from the Figure. In the reversed order, 3 grams of Pt.Rh.Co on $\alpha$-$Al_2O_3$ was placed at the reactor inlet and 1 gram of CoO on $\gamma$-$Al_2O_3$ was placed at the reactor outlet. The catalyst was also tested according to the manner of Example 5 and the results are shown in FIG. 5. Although NO reduction catalyzed by the Pt.Rh.Co on $\alpha$-$Al_2O_3$ component can be discerned to have occurred between about 200° C. and 425°C., NO reduction by the CoO on $\gamma$-$Al_2O_3$ did not occur. Thus, it can be seen that the catalysts must be in the order required by the invention.

We claim:

1. A multicomponent catalyst for removing carbon monoxide, hydrocarbons, and nitrogen oxides from the exhaust gases of a lean burn internal combustion engine operating with an air-fuel ratio above about 18/1 comprising at least two components, each of said components characterized by being able to reduce nitrogen oxides within a temperature range beginning near the onset of activity for oxidation of the carbon monoxide, hydrocarbons, and hydrogen by oxygen and ending at a higher temperature, said components being disposed in reverse order of their temperature range for nitrogen oxides reduction so that the component which reduces nitrogen oxides at the highest temperature range is exposed first to the exhaust gases and with the component which reduces nitrogen oxides at the lowest temperature range being exposed last to the exhaust gases.

2. A multicomponent catalyst of claim 1 wherein three components are exposed to exhaust gases in the sequence:

(a) a first component capable of reducing nitrogen oxides at temperatures above said second and third catalysts;

(b) a second component capable of reducing nitrogen oxides at temperatures above said third catalyst and below said first component; and (c) a third catalyst capable of reducing nitrogen oxides at temperatures below said first and second catalysts.

3. A multicomponent catalyst for removing carbon monoxide, hydrocarbons, and nitrogen oxides from the exhaust gases of an internal combustion engine containing oxygen in excess of the stoichiometric quantity needed for complete combustion comprising at least three components exposed in sequence to the exhaust gases;

(a) a first component capable of reducing nitrogen oxides at temperatures above about 475° C. and up to about 800° C.;

(b) a second component capable of reducing nitrogen oxides at temperatures above about 315° C. and up to about 475° C.; and (c) a third component capable of reducing nitrogen oxides to the diatomic elements at temperatures above about 200° C. and up to about 425° C.

4. A component of claim 3 wherein said first component is cobalt atomically dispersed on gamma alumina.

5. The component of claim 4 wherein said first component contains 4 to 35% by weight of cobalt.

6. A component of claim 3 wherein said second component is an alloy of platinum plus rhodium dispersed on a barium oxide stabilized delta alumina support.

7. A component of claim 3 wherein said second component is an alloy of platinum plus rhodium and cobalt dispersed on a barium oxide stabilized delta alumina support.

8. The component of claim 5 wherein said second component further comprises base metals of Groups IVa, IVb, and VIII of the Periodic Table.

9. A component of claim 3 wherein said third component is an alloy of platinum and rhodium dispersed on an alpha alumina support.

10. A component of claim 3 wherein said third component is an alloy of platinum plus rhodium and cobalt dispersed on an alpha alumina support.

11. The component of claim 9 wherein said third component further comprises Pd.

* * * * *